(12) United States Patent
Gluckman et al.

(10) Patent No.: US 11,389,782 B2
(45) Date of Patent: *Jul. 19, 2022

(54) MOLECULARLY IMPRINTED POLYMER BEADS FOR EXTRACTION OF LITHIUM, MERCURY, AND SCANDIUM

(71) Applicant: 6TH Wave Innovations Corp., Arnold, MD (US)

(72) Inventors: Jonathan P. Gluckman, Arnold, MD (US); Glen E. Southard, Park City, UT (US)

(73) Assignee: 6th Wave Innovations Corp., Arnold, MD (US)

( * ) Notice: Subject to any disclaimer, the term of this patent is extended or adjusted under 35 U.S.C. 154(b) by 1031 days.

This patent is subject to a terminal disclaimer.

(21) Appl. No.: 15/802,783

(22) Filed: Nov. 3, 2017

(65) Prior Publication Data

US 2018/0117564 A1 May 3, 2018

Related U.S. Application Data

(60) Provisional application No. 62/417,164, filed on Nov. 3, 2016.

(51) Int. Cl.
| | |
|---|---|
| *B01J 20/26* | (2006.01) |
| *B01J 20/28* | (2006.01) |
| *B01J 39/14* | (2006.01) |
| *B01J 45/00* | (2006.01) |
| *C08F 212/08* | (2006.01) |
| *C08F 212/14* | (2006.01) |
| *C22B 26/12* | (2006.01) |
| *C22B 3/42* | (2006.01) |
| *C22B 43/00* | (2006.01) |
| *C22B 59/00* | (2006.01) |
| *C08F 12/26* | (2006.01) |

(52) U.S. Cl.
CPC ........... *B01J 20/267* (2013.01); *B01J 20/268* (2013.01); *B01J 20/28016* (2013.01); *B01J 20/28059* (2013.01); *B01J 20/28061* (2013.01); *B01J 39/14* (2013.01); *B01J 45/00* (2013.01); *C08F 212/08* (2013.01); *C22B 3/42* (2013.01); *C22B 26/12* (2013.01); *C22B 43/00* (2013.01); *C22B 59/00* (2013.01); *C08F 12/26* (2013.01); *Y02P 10/20* (2015.11)

(58) Field of Classification Search
CPC ............... B01J 20/267; B01J 20/28016; B01J 20/28059; B01J 20/28051; B01J 39/14; B01J 45/00; C22B 3/42; C22B 26/12; C22B 43/00; C22B 59/00; C08F 212/08

See application file for complete search history.

(56) References Cited

U.S. PATENT DOCUMENTS

| | | |
|---|---|---|
| 3,839,257 A | 10/1974 | Chiu et al. |
| 4,406,972 A | 9/1983 | Fransen |
| 4,415,655 A | 11/1983 | de Castro et al. |
| 4,532,232 A | 7/1985 | Larsson et al. |
| 4,935,365 A | 6/1990 | Nilsson et al. |
| 4,960,762 A | 10/1990 | Sellergren et al. |
| 5,015,576 A | 5/1991 | Nilsson et al. |
| 5,110,883 A | 5/1992 | Gartner |
| 5,208,155 A | 5/1993 | Mosbach et al. |
| 5,281,635 A | 1/1994 | Bishop |
| 5,310,648 A | 5/1994 | Arnold et al. |
| 5,321,102 A | 6/1994 | Loy et al. |
| 5,372,719 A | 12/1994 | Afeyan et al. |
| 5,786,428 A | 7/1998 | Arnold et al. |
| 5,851,499 A | 12/1998 | Gathje et al. |
| 6,063,637 A | 5/2000 | Arnold et al. |
| 6,127,154 A | 10/2000 | Mosbach et al. |
| 6,593,142 B2 | 7/2003 | Kelly et al. |
| 6,660,059 B2 | 12/2003 | Ji et al. |
| 7,067,702 B2 | 6/2006 | Southard et al. |
| 7,319,038 B2 | 1/2008 | Southard |
| 7,476,316 B2 | 1/2009 | Southard |
| 7,678,870 B2 | 3/2010 | Southard et al. |
| 8,058,208 B2 | 11/2011 | Murray et al. |
| 8,591,842 B2 | 11/2013 | Murray et al. |
| 9,504,988 B1* | 11/2016 | Gluckman ............... C22B 3/20 |
| 10,814,306 B2 | 10/2020 | Southard et al. |
| 2002/0092377 A1 | 7/2002 | Ji et al. |
| 2005/0276781 A1 | 12/2005 | Ross et al. |
| 2007/0090058 A1 | 4/2007 | Southard |
| 2008/0038832 A1 | 2/2008 | Sellergren et al. |
| 2008/0264868 A1* | 10/2008 | Murray .................... B01J 39/04 |
| | | 521/30 |

(Continued)

FOREIGN PATENT DOCUMENTS

| | | |
|---|---|---|
| CN | 102008946 A | 4/2011 |
| CN | 102317322 A | 1/2012 |

(Continued)

OTHER PUBLICATIONS

Supplementary European Search Report dated May 28, 2020, for European Application No. 17866594.9, 14 pages.
Ozkutuk et al., "Selective Separation of Thiocyanate Ion by Ion-Imprinted Polymer," Hacettepe Journal of Biology and Chemistry, vol. 37, No. 3, pp. 207-215, Sep. 9, 2009.
International Search Report and Written Opinion dated Aug. 31, 2016, for International Application No. PCT/US2016/036370, 9 pages.

(Continued)

*Primary Examiner* — Yong L Chu
(74) *Attorney, Agent, or Firm* — Cooley LLP

(57) ABSTRACT

The present disclosure provides Molecularly Imprinted Polymer (MIP) technology for selectively sequestering one or more target molecules from chemical mixtures. Also disclosed herein are MIP beads and methods of making and using thereof.

14 Claims, 1 Drawing Sheet

(56) References Cited

U.S. PATENT DOCUMENTS

| | | | |
|---|---|---|---|
| 2010/0091352 | A1 | 4/2010 | Kokeguchi et al. |
| 2010/0286130 | A1 | 11/2010 | Moellmann et al. |
| 2012/0045838 | A1 | 2/2012 | Krozer et al. |
| 2012/0100358 | A1 | 4/2012 | Haupt et al. |
| 2012/0225962 | A1 | 9/2012 | Hearn et al. |
| 2015/0291870 | A1 | 10/2015 | Van Horn et al. |
| 2016/0354770 | A1 | 12/2016 | Murray |
| 2018/0214845 | A1 | 8/2018 | Gluckman et al. |

FOREIGN PATENT DOCUMENTS

| | | | |
|---|---|---|---|
| WO | WO-1989/010956 | A1 | 11/1989 |
| WO | WO-2010/029541 | A1 | 3/2010 |
| WO | WO-2017/019181 | A1 | 2/2017 |

OTHER PUBLICATIONS

International Search Report and Written Opinion dated Jan. 17, 2018, for International Application No. PCT/US2017/059870, 11 pages.
Dahm M. et al. "Investigations on the system ScCl3/K2C03/H20: Synthesis and crystal structures of K5[Sc(C03)4)*5H20 and K7[Sc(C03)4)C03*9*H20", Zeitschrift fur Naturforschung Section B-A Journal of Chemical Sciences, 2002, vol. 57, issue 12, pp. 1439-1445; retrieved from the Internet: <http://www.znaturforsch.com/ab/v57b/s57b1439.pdf>, see entire document, especially p. 1439-1440.
Pyagai I. N. et al. "Recovery of sludge from alumina production", Russian Journal of Applied Chemistry, 2012, vol. 85, issue 11, pp. 1649-1653; retrieved from the Internet: <DOI: 10.1134/S107042721211002X>, see entire document, especially p. 1650.
Extended European Search Report dated Dec. 3, 2018, for European Application No. 16830976.3, 13 pages.
Songjun Li et al., "A Catalytic and Positively Thermosensitive Molecularly Imprinted Polymer," Advanced Functional Materials, Mar. 22, 2011 (Mar. 22, 2011), pp. 1194-1200, XP055526376, DOI: 10.1002/adfm.201001906.
Songjun Li et al., "On/off-switch able catalysis by a smart enzyme-like imprinted polymer," Journal of Catalysis, Academic Press, Duluth, MN, US, vol. 278, No. 2, Nov. 12, 2010 (Nov. 12, 2010), pp. 173-180, XP028142292, ISSN: 0021-9517, DOI: 10.1016/J.JCAT.2010.11.011 [retrieved on Nov. 20, 2010].
Denlzli et al., "Dithiocarbamate-incorporated monosize polystyrene microspheres for selective removal of mercury ions," Reactive and Functional Polymers, Elsevier, Amsterdam, NL, vol. 44, No. 3, Jul. 1, 2000, pp. 235-243.
Extended European Search Report dated Nov. 13, 2020, for European Application No. 17866594.9, 20 pages.

\* cited by examiner

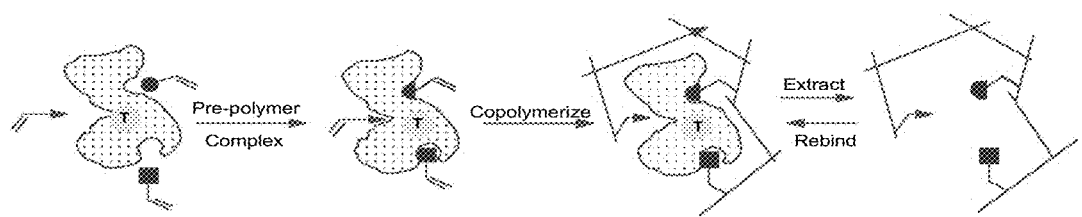
Schematic of MIP Preparation

MOLECULARLY IMPRINTED POLYMER BEADS FOR EXTRACTION OF LITHIUM, MERCURY, AND SCANDIUM

CROSS-REFERENCE TO RELATED APPLICATIONS

The present application claims the benefit of priority to U.S. Provisional Application No. 62/417,164, filed on Nov. 3, 2016, the contents of which are hereby incorporated by reference in their entirety.

BACKGROUND

Extraction and recovery processes are common, for example in water purification, mining, and waste treatment. While the specific unit operations and process chemistries may be different for these processes, the basic approach is the same—elaborate mechanical, float concentration, chemical separation, chemical precipitation, heat, and other chemical processes which are usually lengthy, energy intensive, and expensive. Alternative processes can utilize absorbants to either eliminate or pre-concentrate targets for extraction. Activated carbon or ion exchange absorbents, membrane, reverse osmosis, liquid/liquid extraction methods to remove or sequester dissolved species are common.

Molecularly imprinted polymers ("MIPs") have been developed with substantially improved specificity for a "target" molecule which would be desirable to remove from a process stream (e.g., in waste treatment applications) or to sequester (e.g., isolate) from a process stream because of its value. MIPs are polymers designed to be highly selective for a specific target molecule. MIPs are prepared by polymerizing a polymerizable ligand which coordinates or "binds" to the target molecule. The target molecule and the polymerizable ligand are incorporated into a pre-polymerization mixture, allowed to form a complex, then polymerized (typically in the presence of one or more non-ligand monomers and a cross-linking monomer). The target molecule thus acts as a "template" to define a cavity or absorption site within the polymerized matrix which is specific to the target molecule (e.g., has a shape or size corresponding to the target molecule). The target molecule is then removed from the MIP prior to its use as an absorbent.

However, while highly selective to the desired target molecule, MIPs have significant drawbacks. For example, if the target molecule is highly valuable (e.g. a precious metal) or hazardous (e.g., toxic or radioactive), the need to use the target molecule itself as a template in preparing the MIP can be prohibitively expensive due to e.g., the cost of the target molecule or the precautions required to handle the target molecule compared to less selective, but far cheaper absorbants. In addition, because the target molecule must remain complexed to the polymerizable ligand during the polymer synthesis, if the target molecule/polymerizable ligand complex is unstable or otherwise incompatible with the polymerization conditions (e.g., catalyst, other monomers, low solubility, etc.) it may not be possible to prepare the MIP at all, or require complex or difficult reaction conditions. Accordingly, it would be desirable to prepare absorbents with the advantageous selectivity and other characteristics of conventional MIP materials, but without the disadvantages inherent in using the target molecule as a template in preparing the MIP. The methods and materials of the present disclosure provide such improvements over conventional MIP materials and processes.

SUMMARY OF THE INVENTION

The present disclosure relates generally to molecularly imprinted polymers. More particularly, the present disclosure relates to ionic molecularly imprinted polymer beads for binding target molecules present in sometimes complex mixtures, utilizing, in various embodiments, inorganic or organic anions, including dianions and trianions as surrogates for anionic target metal complexes with similar charge and molecular structure. In certain embodiments, the present disclosure relates to anionic molecularly imprinted polymer beads for selectively binding the cationic target metal component of an anionic target metal complex present in a mixture. In such MIP beads, the anionic ligand(s) in the MIP binding cavity is/are designed or selected to have a higher affinity for the target metal cation of the anionic target metal complex compared to the anionic ligands of the complex. In still other embodiments the present disclosure relates to high surface area MIP beads. As such, the present disclosure involves the fields of chemistry, polymers, and materials science.

The present disclosure, in part, provides macroreticular polymer beads and methods of making and using thereof. The present disclosure also provides methods of selectively sequestering one or more target metal ions or target metal ion complexes from a solution of the one or more target metal ions or metal ion complexes admixed with other ions. For example, the present disclosure provides methods of selectively sequestering $Hg(CN)_4^{2-}$ in the presence of $Au(CN)_2^-$ and $Li^+$ and $Sc(CO_3)_3^{3-}$ in the presence of other metal salts such as sodium, magnesium, calcium, iron, etc. This disclosure further addresses the need for new MIP technologies (including MIP materials, methods of manufacturing, and methods of using such MIP materials) that can be used to selectively isolate the desired target molecule, ion and/or complex in good yield, with high efficiency for removing the target ion or ion complex, good capacity for the target ion or complex, and which are regenerable if the requirements of the particular act application so demand. In addition, the present disclosure provides for unique methodologies for making high surface area MIPs to allow for both high selectivity and high capacity. This is particularly important for sequestion and or removal of large quantities of low mass ions or molecules. Further, this methodology allows for production using suspension polymerization methods that yields a product with qualities (hardness, stability, pH tollerance, etc) that allow for use across a broad spectrum of applications and process conditions.

One of the embodiments of the present disclosure relates to a plurality of macroreticular polymer beads comprising a copolymer having a plurality of complexing cavities which selectively bind a target metal ion complex, wherein the copolymer is prepared from:
 (a) one or more cationic ligand monomers which are complexed to a non-metal surrogate di- or trianion,
 (b) one or more uncharged monomers, and
 (c) one or more crosslinking monomers;
 wherein:
 (i) the charge of the copolymer in the complexing cavity is opposite the charge of the target metal ion complex, and
 (ii) the non-metal surrogate di- or trianion has substantially the same shape and charge as the target metal ion complex.

In another embodiment, the present disclosure relates to a plurality of macroreticular polymer beads comprising a copolymer having a plurality of complexing cavities which selectively bind a target metal ion complexed to one or more anionic ligands, wherein the copolymer is prepared from:
(a) one or more anionic ligand monomers which are complexed to a surrogate cation,
(b) one or more uncharged monomers, and
(c) one or more crosslinking monomers;
wherein:
(i) the charge of the copolymer in the complexing cavity is the opposite of the charge of the target metal ion,
(ii) the surrogate cation has substantially the same shape and charge as the target metal ion, and
(iii) the target metal ion has a higher binding affinity for the ligand monomer than the surrogate cation.

In another embodiment, the present disclosure relates to a plurality of macroreticular polymer beads comprising a copolymer having a plurality of complexing cavities which selectively bind a target metal ion, wherein the copolymer is prepared from:
(a) one or more anionic ligand monomers which are complexed to the target metal ion,
(b) one or more uncharged monomers, and
(c) one or more crosslinking monomers;
wherein the copolymer comprises more than about 50 mol % anionic ligand monomer.

Another embodiment relates to a method of preparing macroreticular molecularly imprinted polymer beads as described herein, comprising polymerizing:
(a) one or more cationic ligand monomers complexed to a non-metal surrogate di- or trianion,
(b) one or more uncharged monomers, and
(c) one or more crosslinking monomers,
wherein:
(i) the charge of the copolymer in the complexing cavity is opposite the charge of the target metal ion complex, and
(ii) the non-metal surrogate di- or trianion has substantially the same shape and charge as the target metal ion complex.

Another embodiment relates to a method of preparing macroreticular molecularly imprinted polymer beads comprising polymerizing:
(a) one or more anionic ligand monomers which are complexed to a surrogate cation such as $Ca^{2+}$,
(b) one or more uncharged monomers, and
(c) one or more crosslinking monomers;
wherein:
(i) the charge of the copolymer in the complexing cavity is the opposite of the charge of the target metal ion,
(ii) the surrogate cation has substantially the same shape and charge as the target metal ion, and
(iii) the target metal ion has a higher binding affinity for the ligand monomer than the surrogate cation.

Another embodiment relates to a method of preparing macroreticular molecularly imprinted polymer beads as described herein, comprising polymerizing:
(a) one or more anionic ligand monomers which are complexed to the target metal ion,
(b) one or more uncharged monomers, and
(c) one or more crosslinking monomers;
wherein:
(i) the copolymer comprises more than about 50 mol % anionic ligand monomer.

Some embodiments relate to a method of selectively sequestering one or more target metal ions from a solution of the one or more target metal ions admixed with other ions, comprising first contacting the macroreticular polymer beads with a stripping solution, whereby the non-metal surrogate ions are removed from the macroreticular polymer beads, then contacting the stripped beads with the solution, thereby selectively sequestering the target ion in the macroreticular polymer beads.

Unless otherwise defined, all technical and scientific terms used herein have the same meaning as commonly understood by one of ordinary skill in the art to which this disclosure belongs. In the case of conflict, the present specification, including definitions, will control. In the specification, the singular forms also include the plural unless the context clearly dictates otherwise. Although methods and materials similar or equivalent to those described herein can be used in the practice or testing of the present disclosure, suitable methods and materials are described below. All publications, patent applications, patents, and other references mentioned herein are incorporated by reference herein, for all purposes. The references cited herein are not admitted to be prior art to the claimed inventions. In addition, the materials, methods, and examples are illustrative only and are not intended to be limiting.

Other features and advantages of the present disclosure will be apparent from the following detailed description and claims.

BRIEF DESCRIPTION OF THE DRAWINGS

FIG. 1 is a schematic of the MIP production process.

DETAILED DESCRIPTION

The present disclosure is directed, in various embodiments, to improved methods for preparing molecularly imprinted polymer ("MIP") absorbents or materials, MIP absorbents or materials prepared by such processes, and improved processes utilizing the MIP absorbents or materials of the present disclosure.

Absorption-based processes are often designed to separate, extract, or sequester a specific molecular specie or "target" molecule from a mixture, either to isolate the target molecule (e.g., because of its value), remove a specific specie from a mixture (e.g., because of its toxicity or other hazardous properties), or to detect the target molecule (or molecules associated with the target molecule). Molecularly imprinted polymers are highly selective absorbents with absorption sites specifically tailored to bind to a particular target molecule. Examples of known MIPs and methods of preparing and using MIPs include those disclosed in U.S. Pat. Nos. 7,067,702; 7,319,038; 7,476,316; 7,678,870; 8,058,208; 8,591,842, and U.S. Ser. No. 15/176,758 which are incorporated by reference herein in their entirety for all purposes. These MIPs are copolymers prepared by polymerizing a polymerizable ligand for the target molecule (i.e., a "ligand monomer") in a polymer matrix composed of one or more non-ligand monomers (e.g., styrene or other monomers which do not form a complex with the target molecule), and one or more crosslinking agents. Conventionally, the "templated" absorption sites characteristic of MIPs are prepared by forming an appropriate complex of the ligand monomer with the target molecule, then polymerizing the resulting target molecule-ligand monomer complex in the presence of one or more non-ligand monomers and at least one cross-linking agent, under suitable polymerization conditions. The resulting polymer structure comprises a matrix of the polymerized non-ligand monomer(s) with dispersed binding sites or cavities ("complexing cavities") containing the target molecule, still complexed to the (now polymerized) ligand monomer. Because the polymerization is carried out in the presence of the target molecule, the target molecule forms a "template" so that the size and shape of the complexing cavity is specific to the particular target molecule, resulting in highly selective binding to the target molecule relative to other molecules. A schematic diagram of the templating process for preparing MIP materials is shown in FIG. 1.

As discussed above, while utilizing the target molecule as a molecular template provides highly selective complexing cavities optimal for binding the target molecule, the conventional MIP manufacturing process poses significant manufacturing and/or scale-up problems due to the need to use the target molecule itself in manufacturing. Large scale manufacturing would therefore require use of large amounts of the target molecule, which can be a particular problem (even in small scale manufacturing) if the target molecule is expensive, relatively unavailable, toxic, radioactive, interferes with the polymerization of the MIP, etc., or any combinations of these factors.

Surprisingly, Applicants have found that the selectivity advantages of conventional MIPs can be retained without the need to use the target molecule itself as a template for the binding site, by substituting an appropriately selected "surrogate" molecule for the target molecule. As will be exemplified herein, a MIP selective for target molecule "A" can be prepared by polymerizing a complex of a suitable surrogate molecule "B" with ligand monomer(s), non-ligand monomer(s) and crosslinking monomer(s), provided that "A" and "B" complex to the ligand monomer using the same physicochemical mechanism, have similar size and/or shape, and "B" is one or more of less expensive, less hazardous (i.e., toxic, radioactive), or more compatible with the polymerization conditions compared to "A." The resulting "surrogate" templated MIPs, while perhaps somewhat less selective for the target molecule than those prepared using the conventional process (in which the target molecule serves as the molecular template) are much less expensive, safer to prepare, easier to manufacture and scale-up, etc., yet sufficiently selective in e.g., separation or extraction applications to be similar in performance to conventional MIPs, yet substantially lower in cost. Moreover, the "surrogate" templated MIPs of the present disclosure provide substantial improvements in overall separation process costs due to their combination of high performance at relatively low cost.

While various exemplified embodiments of MIP materials and methods disclosed herein relate to cationic MIPs, any suitable physicochemical interaction for binding a particular target molecule can be employed depending on the chemical structure and characteristics of the target molecule. Various different physicochemical interactions between the ligand monomer and target molecule which can be exploited to prepare MIPs materials according to the disclosure include covalent, ionic, ion-dipole, hydrogen bonding, dipole-dipole, induced dipole or instantaneous dipole-induced dipole (i.e., London dispersion) attractive interactions, and minimizing coulombic and steric repulsive interactions. When the target molecule is an ion (e.g., a "target ion" such as any of the metal dianion and trianion complexes described herein), it is convenient to utilize ionic interactions by selecting a ligand monomer having an ionic functional group of complementary charge. For example, when the target ion is cationic, the ligand monomer includes an anionic functional group (e.g., a carboxylate, sulfonate, phosphonate, or other acid salt) capable of forming a complex with the cationic target ion, and when the target ion is an anion (e.g., a dianion or trianion), the ligand monomer includes a cationic functional group (for example a quaternary ammonium ion), or an uncharged ligand prepared from 1-(4-vinylpyridine-2-yl)methanimine or similar polymerizable imines, optionally substituted with an alkyl group as described herein on the imine nitrogen atom) capable of complexing with the anionic target ion, or a polymerizable crown ether such as dibenzo 14-crown-4 or benzo-12-crown-4 (wherein the polymerizable moiety can include any polymerizable moiety described herein, such as acrylates, methacrylates, vinyl groups, etc. with any suitable linking group, if needed). When the target molecule is neutral (i.e., has no formal charge), suitable uncharged ligand monomers include but are not limited to monomers including functional groups such as imines (as described herein), amines, phosphines, esters, ethers, cryptands, thio ethers, Schiff bases and the like. Neutral target molecules typically include, for example small organic molecules such as but not limited to pesticides, drug molecules, radiotracers, and the like. Prior to polymerization with one or more uncharged monomers and one or more cross-linking monomers to form the MIP bead, the ligand monomer is mixed with the surrogate ion (or in some circumstances, target ion) which allows the ligand monomer to "self assemble" or coordinate to the surrogate ion (or target ion) such that during polymerization the surrogate ion (or target ion) is incorporated into the polymerized MIP bead. As needed, the surrogate ion (or target client) can be removed from the bead before use by displacement with an appropriate alternative ion, or can remain in place prior to use.

Suitable surrogates can be selected by first characterizing the size, shape, and relevant physicochemical characteristics of the target molecule. Candidate surrogate molecules of similar molecular shape and size, and similar physicochemical characteristics can then be identified by, for example, molecular modeling using commercially available molecular modeling programs such as ChemBioDraw® Ultra 14.0 For example, if the target molecule is ionic, the surrogate ion would be selected to have a similar size, shape, and charge as the target ion. Advantageously, the surrogate should be relatively inexpensive, non-toxic, and not interfere with the polymerization (i.e., should not form a highly unstable complex with the ligand monomer, poison the polymerization catalyst, inhibit the initiator, react with other monomers or polymerization solvents, be insoluble in the polymerization solvent, etc.). The balancing of these various factors renders the selection of surrogates suitable for various target molecules and separation processes, unpredictable.

Polymerizable ligands, for instance 4-vinylbenzyl tri-n-butyl ammonium chloride and other cationic ligands as described herein, have been designed for the extraction of anionic metallic salts from aqueous solutions. Such polymerizable ligands are soluble in water until reacted or complexed with an anion, for example a dianion such as 2,2'-(1,4-phenylene)diacetate (also named 1,4-pheneylene diacetate), or a trianion such as trimesylate, and then precipitate from solution. The resulting precipitate is soluble in an organic solvent. The anion mimics the molecular shape and charge of a particular target metal anion, such as $Sc(CO_3)_3^{2-}$ or $Au(S_2O_3)_2^{3-}$. The resulting ligand/anion complex is then polymerized into a hydrophobic polymer matrix, such as styrene, to form porous beads or particles, which can then be utilized for the selective removal of the desired metal anion (e.g., $Sc(CO_3)_3^{2-}$ or $Au(S_2O_3)_2^{3-}$) from an aqueous solution.

In another embodiment, MIPs according to the present disclosure can include monomer ligands in the binding cavity having an affinity for the metal cation component of the target anionic complex which is higher than the affinity of the anionic ligands of the target ion complex. For example, various mining process streams form $Hg(CN)_4^{2-}$ complexes. While $Hg(CN)_4^{2-}$ could be considered a "target ion complex" and a MIP could be prepared which is selective for the tetracyanate complex, and alternative approach is to prepare a MIP having a ligand monomer which binds or coordinates more strongly to $Hg^{2+}$ than $CN^-$. In such a MIP, the surrogate ion would be a cation (rather than an anion), and the ligand moiety of the ligand monomer would be an anion (rather than a cation) selected to bind more strongly to $Hg^{2+}$ than $CN^-$, as well as binding more strongly to $Hg^{2+}$ than the surrogate cation. For $Hg^{2+}$ such a ligand monomer can include a polymerizable dithiocarbamate such as 4-vinylbenzyl dithiocarbamate, and the surrogate can be a dication such as $Ca^{2+}$. In use, a MIP with such dithiocarbamate complexing sites would selectively bind $Hg^{2+}$ in the presence of the $Hg(CN)_4^{2-}$ complex, as the dithiocarbamate moieties coordinate more strongly to $Hg^{2+}$ than $CN^-$.

The use of a ligand/surrogate (e.g., dianion, trianion, carboxylate or dithiocarbamate) complex for producing ion selective MIP resins provides a material superior to existing ion-exchange resins, for example with improved selectivity for target ions, maintaining better activity during use, reduced need for multiple process steps to separate the target ion from other species which compete for the ion exchange binding sites, and improved regeneration properties. The use of such "surrogates" instead of the target ion in preparing MIPs also reduces the overall cost for developing and scaling up molecularly imprinted polymer resins, as well as reducing the amount of potential hazardous waste and/or reclamation of the target molecule (for further use), and their associated costs for processing.

MIP beads according to the present disclosure can have any suitable shape, ranging from approximately spherical, to elongated, irregular (e.g., similar to the irregular shape of cottage cheese curds), or formed to specific desired shapes.

In various embodiments, it is desirable that the molecularly imprinted polymer be in the form of beads, particularly porous beads that have sufficient porosity so as to allow facile mass transport in and out of the bead.

The term "bead" refers to a plurality of particles with an average particle size ranging from about 250 µm to about 1.5 mm. In some embodiments, the average particle size of the beads can be about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1000 µm, about 1050 µm, about 1100 µm, about 1150 µm, about 1200 µm, about 1250 µm, about 1300 µm, about 1350 µm, about 1400 µm, about 1450 µm, or about 1500 µm, including any ranges between any of these values. In particular embodiments, the average particle size range is from about 0.3 mm to 1.1 mm.

In some embodiments, the MIP beads of the present disclosure have a substantially unimodal particle size distribution. In other embodiments, it may be desirable for the MIP beads to have a bimodal or other multimodal particle size distribution.

In many processes, material handling or mass flow requirements dictate that the percentage of fine particles be low. Accordingly, in particular embodiments, less that about 10% of the MIP beads of the present disclosure have a particle size less than about 250 µm. In other embodiments, less than about 5% or less than about 1% of the beads have a particle size less than about 250 µm. The average particle size of the beads may be measured by various analytical methods generally known in the art including, for example, ASTM D 1921-06.

In most embodiments, it is desirable that the beads of the present disclosure be porous to facilitate mass flow in and out of the bead. In particular embodiments, the MIP beads of the present disclosure are characterized as "macroreticular" or "macroporous," which refers to the presence of a network of pores having average pore diameters of greater than 100 nm. In various embodiments, polymer beads with average pore diameters ranging from 100 nm to 2.4 µm are prepared.

In some embodiments the average pore diameters can be about 100 nm, about 200 nm, about 300 nm, about 400 nm, about 500 nm, about 600 nm, about 700 nm, about 800 nm, about 900 nm, about 1000 nm, about 1100 nm, about 1200 nm, about 1300 nm, about 1400 nm, about 1500 nm, about 1600 nm, about 1700 nm, about 1800 nm, about 1900 nm, about 2000 nm, about 2100 nm, about 2200 nm, about 2300 nm, or about 2400 nm, including ranges between any of these values.

The beads can also be mesoporous, or include mesopores (in addition to macropores). The term "mesoporous" refers to porous networks having an average pore diameter from 10 nm to 100 nm. In some embodiments mesopore average pore diameters can be about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm, including any ranges between any of these values.

In addition, the beads can also be microporous, or include micropores in addition to macropores and/or mesopores. The term "microporous" refers to porous networks having an average pore diameter less than 10 nm. In some embodiments micropore average pore diameters can be about 0.5 nm, about 1 nm, about 1.5 nm, about 2 nm, about 2.5 nm, about 3 nm, about 3.5 nm, about 4 nm, about 4.5 nm, or about 5 nm, or about 5.5 nm, about 6 nm, about 6.5 nm, about 7 nm, about 7.5 nm, about 8 nm, about 8.5 nm, about 9 nm, about 9.5 nm, or about 10 nm, including ranges between any of these values.

The macroreticular polymer beads have a surface area of about 0.1 to about 500 $m^2/g$, for example about 0.1, about 0.5, about 1, about 5, about 10, about 15, about 20, about 30, about 40, about 50, about 60, about 70, about 80, about 90, about 100, about 150, about 200, about 250, about 300, about 350, about 400, about 450, or about 500 $m^2/g$, inclusive of all ranges and subranges therebetween.

The structure and porosity of the beads are determined principally by the conditions of polymerization. The desired porosity of the bead can be achieved by the choice of surrogate/ligand monomer complex, non-ligand monomer and crosslinking agents and their amounts, as well as the composition of the reaction solvent(s) and optional pore forming additives or thixotropic agents. Porosity determines the size of the species, molecule or ion that may enter a specific structure and its rate of diffusion and exchange, as well as the rate of mass flow in and out of the bead structure.

The thixotropic agents can significantly improve control of bead formation and substantially uniform bead or particle size. Suitable thixotropic agents employed herein are dependent on the type and amount of monomer employed and the suspending medium. The thixotropic agents can also advantageously act as suspension agents during the suspension polymerization process. Representative examples of such thixotropic agents include, but are not limited to, cellulose ethers such hydroxyethylcellulose, (commercially available under the trade name of "CELLOSIZE"), cross-linked polyacrylic acid such as those known under the name of "CARBOPOL" polyvinyl alcohols such as those known under the trade name of "RHODOVIOL", boric acid, gums such as xanthan gum and the like and mixtures thereof. The amount of thixotropic agents can influence the size of the resin (i.e., the use of larger amounts of thixotropic agents often results in the formation of smaller resin particles).

The amount of the thixotropic agent is generally from about 1.5 to about 5 weight percent, based on the weight of the monomers in the monomer mixture. In some embodiments, the amount of the thixotropic agent is from about 1.5 to about 2.5 weight percent, based on the weight of the monomer or monomers (combination of monomers) in the monomer mixture.

The beads of the present disclosure can be prepared by various polymerization techniques. A polymer matrix can then be formed via a suitable polymerization technique in the presence of the surrogate/ligand monomer complex to form an imprinted resin. The resin product can be then be recovered. Non-limiting examples of suitable polymerization techniques can include aqueous suspension polymerization, inverse suspension polymerization (e.g. in perfluorocarbon), non-aqueous dispersion polymerization, two-stage swelling polymerization, aerosol polymerization, latex seeded emulsion polymerization, electropolymerization, and bulk polymerization on porous bead substrates. In one embodiment, the polymerization method is the aqueous suspension polymerization of a copolymerizable mixture of an organic phase containing non-ligand monomer, an optional crosslinker, and the surrogate/ligand monomer complex, and an aqueous phase containing at least one or more thixotropic agents.

Non-covalent electropolymerized molecular imprinted polymers (E-MIPs) according to the disclosure can be used as chemosensitive ultrathin films with high selectivity for the detection of drugs and other chemicals. Electropolymerization is one of the strategies for the preparation of MIP modified electrodes. A MIP film with special selectivity is deposited on the surface of the detector, which can be used, for example, for the analysis of proteins from biological fluids or in pharmaceutical, agricultural, food and environmental (e.g., water treatment) analysis.

In certain embodiments of the present disclosure, a MIP is prepared by suspension polymerization of a surrogate/ligand monomer complex and other monomers as described herein. In the suspension polymerization procedure, the various phases can be thoroughly mixed separately prior to the start of the reaction and then added to the polymerization reaction vessel. While this mixing of the ingredients can be done in a vessel other than the reaction vessel, the mixing can alternatively be conducted in the polymerization reaction vessel under an inert atmosphere, particularly where the monomers being employed are subjected to oxidation. Further, in order to improve yields and selectivity of the final resin product, it is desirable that the ligand monomer be hydrolytically stable under polymerization conditions and in the final product. For example, the ligand monomer can be hydrolytically stable in a suspension polymerization formulation and under a water treatment environment such that hydrolysis is substantially avoided during polymerization and the useful life of the resin.

The polymerizable ligand/surrogate complex of the present disclosure can be polymerized under suspension polymerization conditions where the aqueous phase contains thixotropic agents such as polyvinyl alcohol and boric acid in water, and the organic phase comprises, for example, the polymerizable ligand/surrogate complex, styrene (non-ligand monomer), divinylbenzene (cross-linking monomer), organic solvents, and AIBN (initiator). The biphasic mixture is agitated, for example with a stirrer. By varying the temperature, agitation, polymerizable ligand/surrogate loading, solvent ratios, and degree of cross-linking, different beads structures and properties can be obtained. For example, spherical and porous beads of the desired size can be obtained by controlling the agitation or stirring during the polymerization. When the polymerization mixture is agitated to disperse the monomers dissolved in the organic reaction medium as droplets within the aqueous phase, suitably the droplets are of such size that when transformed into polymer beads, they are substantially spherical and porous, and of the desired size. Unsuitable reaction conditions can lead to the formation of no or very small beads, high surrogate losses to the aqueous phase, low overall yield, and insufficient porosity such that there is poor mass transfer to the complexing cavity. In a particular embodiment, the ligand monomer is a polymerizable ammonium salt, such as one of the polymerizable ammonium salts disclosed herein, and the surrogate is an anion, for example one of the anions disclosed herein. In more particular embodiments, the ligand monomer is a polymerizable 4-vinylbenzylammonium salt and the surrogate is thiocyanate, pentathionate, isophthalate, phosphate, or succinate.

Polymerization can be carried out at any suitable temperature. In some embodiments, the reaction is carried out at an elevated temperature, for example above about 50° C. in the presence of an optional initiator. Suitable initiators that can be used include but are not limited to benzoyl peroxide, diacetylperoxide, and azo-bisisobutyronitrile (AIBN). The amount of initiator employed can be within the range of about 0.005 to about 1.00% by weight, based on the weight of the monomer being polymerized. In the presence of an initiator, the temperature of reaction is maintained above that at which the initiator becomes active. Lower temperatures, e.g. about −30° C. to about 200° C., can be employed if high energy radiation is applied to initiate polymerization. Styrenic polymerizations can be thermally initiated.

Proper and sufficient agitation or stirring throughout the polymerization typically provides substantially spherical and porous beads having the desired size. For example, the polymerization mixture can be agitated to disperse the monomers (dissolved in the solvent organic phase) in the aqueous solvent phase by shear action, thereby forming droplets. By selecting the proper level of agitation, the droplets can be of such size that when transformed into polymer beads, they are substantially spherical and porous, and will have the desired size as discussed herein.

Various means are available to maintain the proper agitation. When polymerization is conducted in a reactor made of stainless steel, such a reactor can be fitted with a rotatable shaft having one or more agitator blades. When a round-bottom flask is used as a reactor, an overhead stirrer can be used to agitate the reaction medium. The amount of agitation necessary to obtain the desired results will vary depending upon the particular monomers being polymerized, as well as the particular polymer bead size desired. Therefore, the agitation speed such as the rpm (revolutions per minute) may be regulated within certain limits. Polymerization times can vary from about 3 hours to about 72 hours, depending on the reactivity of the monomers.

When polymerization is complete, the surrogate can be removed from the typically cross-linked polymer beads without substantially affecting the complexing cavity.

Removal of the surrogate molecule provides e.g. a bead having a porous structure with complementary molecular cavities therein that has high binding affinity for the target molecule (or ion). For example, when the surrogate is a tetra-, penta- or hexathionate a hexa-, heptyl- or octyldionate; 1,4-phenylene diacetate: or butane, pentane, or hexane disulfonates (for providing a $Au(S_2O_3)_2^{3-}$ selective cavity), the surrogate can be removed ("stripped") from the binding site in the beads by flushing with an about 10 M HCl solution to provide a ligand/sulfate complex suitable for sequestering $Au(S_2O_3)_2^{3-}$ from e.g. a mining leach process. Similarly, when the surrogate is a tribasic salt of trimesic acid (for providing a $Sc(CO_3)_3^{3-}$ selective cavity) the respective surrogates can be removed from the binding site in the beads by flushing with concentrated hydrochloric acid and an alcohol such as methanol to provide a MIP suitable for sequestering the respective ions as described herein. In other embodiments, such as MIPS with a $Ca^{2+}$ surrogate and dithiocarbamate ligands (for providing a $Hg^{2+}$ selective cavity for treating $Hg(CN)_4^{2-}$ containing mixtures), there is no need to remove the surrogate ion, as the strong, preferential binding of $Hg^{2+}$ for the dithiocarbamate ligands will effect displacement of the $Ca^{2+}$ in use.

Various of the MIP materials of the present disclosure can be reused (regenerated) more than once and frequently up to about 30 times or more, depending on the particular resin and the treated liquid medium. Regeneration can be accomplished in much the same manner as removal of the original imprint ion, e.g. stripping or washing with an appropriate solution.

In other embodiments, the MIP materials are not regenerated. For example, in mining process producing $Hg(CN)_4^{2-}$ waste streams, once the Hg-selective MIP (as described herein) reaches the desired level of capacity with $Hg^{2+}$, the Hg-saturated MIP can be disposed of according to relevant environmental and other regulatory standards. Similarly, if the target ion is sufficiently valuable (e.g., $Au(S_2O_3)_2^{3-}$ or $Sc(CO_3)_3^{3-}$), rather than regenerate the Au- or Sc-selective MIP, it may be more economical to "destructively" recover Au or Sc metal from the MIP by combustion under oxidative conditions.

Macroreticular MIP beads are particularly useful for selectively removing or adsorbing target dissolved species from solutions, for example water streams, e.g., drinking water, lakes, streams, industrial effluent streams, mining extraction and waste streams, etc. In one embodiment, the MIP beads of the present disclosure are prepared from ligand monomers which are ionic, for example cationic (for complexing to anions) or anionic (for complexing to cations).

In a particular embodiment, the MIP beads of the present disclosure are useful for selectively sequestering metals, such as mercury from mining operations. The mining of such metals typically involves crushing the gold and/or silver ore (containing mercury impurities), and then the metal is extracted from the crushed ore with concentrated cyanide solutions to form an aqueous solution containing soluble cyanide complexes, for example $Hg(CN)_4^{2-}$ and inter alia various copper, nickel, zinc, cobalt, chromium, and iron salts. Because of the toxicity of mercury salts, it is desirable to selectively remove mercury salts without affecting the yield of precious metals (gold and silver).

Roughly 60% of all gold produced annually has been through some variation of the Gold-Cyanide Process (GCP). For suitable GCP solutions activated carbon is the most common sequestering substrate for the removal of dicyanoaurate, accounting for over half of all gold extracted (or over 1250 tons in 2004). Activated carbon is cheap to manufacture, absorbs gold readily, is fairly selective for gold, and has a large gold loading capacity. Unfortunately, activated carbon also has a high affinity for mercury (II) tetracyanide and under some conditions mercury (II) tetracyanide may actually displace dicyanoaurate from the activated carbon. Mercury (II) tetracyanide desorbs with dicyanoaurate when eluted from the activated carbon. Mercury (II) tetracyanide is also reduced to elemental mercury during the electrowinning process that isolates metallic gold. In both conditions, the elemental mercury presents both health and environmental hazzards and is expensive to remediate. Furthermore, the elution process is not 100% efficient for activated carbon and some traces of mercury remain on the activated carbon. Subsequently, upon thermal reactivation of the activated carbon, the mercury is thermally reduced to mercury metal, which then volatilizes and escapes into the atmosphere. The reactivation step is unavoidable as activated carbon also absorbs organic matter, which can foul and substantially reduce its capacity.

Accordingly, more efficient and selective adsorbents for mercury extraction processes, which can be used as a pre-filter for existing mining activities or treatment of waste fluids which have high affinity for mercury at the exclusion of the precious metal targets such as gold and silver would significantly reduce the capital and operating costs in precious metal mining (and subsequent extraction) processes. The MIP absorbents of the present disclosure provide such improved absorbents.

Mercury is an undesirable element that has been found in numerous underground sources for gold mining and petrochemical industries. Its presence is a headache for both industries for environmental reasons and due to corrosion issues in particular for the petrochemical field. It is desired to removed mercury specifically without accidentally removing gold during gold-mining, so MIPs prepared according to the methods of the present invention with a dithiocarbamate calcium complex (see below) are suitable for specifically removing mercury from a variety of compositions without affecting the absorption of gold at a downstream adsorption plant. Suitable R groups include $C_4$-$C_{24}$ alkyl groups, including linear and branched saturated alkyl groups, such as $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, or $C_{24}$ branched or linear alkyl groups. The role of the calcium during the preparation of the MIPS is to act as a place holder (same charge and nearly identical ionic radius as mercury) until the adsorption cavity in the resulting MIP is formed. The calcium can be removed by an acid wash, or simply used as-is as discussed above, since dithiocarbamates have a very high affinity for mercury. Such a MIP resin would be a "one and done" material with no need for regeneration, so the number of active sites can be substantially increased to improve the overall capacity. Suitable capacities mercury capacities range from at least about 15, 20, 25, 30, 35, 40 or more grams of mercury per gram MIP. The structural integrity of such a disposable material would be secondary to the MIPS overall affinity and capacity for mercury.

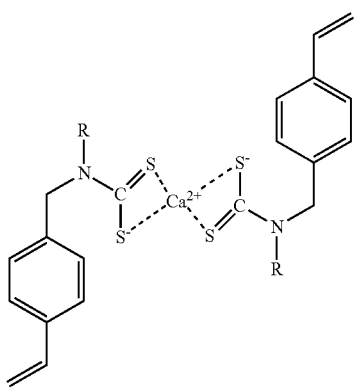

4-vinylbenzyl dithiocarbamate calcium complex

Scandium is a metal with expanding demand because of its ability to add significant strength to lightweight alloys such as aluminum. Scandium is currently mined using highly acidic lixiviants. Under such conditions metals including scandium and other metals are found in the lixiviant in elemental form. Ion exchange resins are not selective in such cases as many metals found in scandium deposits have three charges (like scandium). As a result conventional processes for obtaining scandium include a complex set of extraction, separation, and precipitation steps to obtain scandium in even modestly pure form. The inventive scandium-selective MIP materials provide selective extraction of scandium in such cases where differentiation between the various metals in the mixture may rely solely on size and shape.

Typically, scandium bearing ore is treated with acid, which dissolves other metals contained in the ore, in addition to scandium. Many of these metals, for example iron and aluminum, like scandium are also trivalent. Thus, they can be difficult to separate from scandium using conventional, non-selective absorption media. The acidic mixture or metal salts is then made basic, e.g., with an alkaline carbonate, and the scandium cation is converted to scandium tricarbonate. While iron and aluminum form precipitates is the alkaline solution, other metals (e.g., rare earth metals, uranium, titanium, tungsten, nickel, tantalum, and/or niobium, depending on the ore) are carried through. The MIP compositions described herein, prepared using ligand monomers and surrogates designed to selectively bind $Sc(CO_3)_3^{3-}$ are able to remove $Sc(CO_3)_3^{3-}$ with high selectivity and capacity from such mixtures.

In one of the embodiments the MIPs of the present disclosure can be useful for detection and/or selective removal of rare earth metals (REMs) such as $Sc(CO_3)_3^{3-}$ or rare earth elements (REEs) in the presence of other REMS. Due to the fact that the physico-chemical properties of REEs are very similar, their separation from each other can be very difficult using conventional separation methods. However, such separations of Sc from REMs can be efficiently carried out with the MIPS of the present invention, as disclosed herein.

REMs or REEs of the present disclosure is defined as one of a set of seventeen chemical elements in the periodic table, specifically the fifteen lanthanides (e.g., cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), terbium (Tb), thulium (Tm), ytterbium (Yb) as well as scandium (Sc) and yttrium (Y).

Lithium mining is accomplished in various ways. One of the more popular methods comprises injection of water into salt deposits containing lithium and then evaporation of the resulting lithium-containing water on large plots of land to remove the water by evaporation. After sedimentation, the mixture of lithium salts and many other components is then processed further, for example by extraction of the lithium from solution through a series of membranes, filters, and absorption media. In such cases, use of a MIP selective for lithium provides an essentially instantaneous method for collection of the lithium at high purity and requires far less processing and use of water to obtain lithium at commercially useful levels of purity.

Large lithium and other metal deposits are also associated with the hot brines that are tapped to provide geothermal energy. In such cases, high pressure and hot brines are pumped to the surface. Heat exchangers are utilized to convert the geothermal energy to steam to drive steam turbines for the production of electricity, and the brines must be maintained at a sufficient pressure and temperature to prevent precipitation of the salts and other dissolved materials and allow for injection of the cooled brine back into the earth. No current extraction technology is available to extract the dissolved metals in these hot brine solutions while maintaining the integrity of the primary geothermal energy production process. The lithium-selective MIP materials of the present invention are capable of operating in this environment and can extract sufficient lithium at commercially useful and valuable quantities; achieving production levels of as much as 20,000 tons of lithium annually.

Creating an economical MIP for lithium is challenging due to its low atomic mass and moderate value as a commodity. In order for the cost of a MIP-based process to be cost competitive, virtually the entire MIP needs to comprise the ligand monomer component. One way of preparing a cost-effective lithium-selective MIP is to prepare such MIP's by reverse phase suspension polymerization (RPSP). Overall, RPSP works much the same as "normal" suspension polymerization, with the exception that in RSPS all of the polymerization occurs in the aqueous phase (rather than the organic phase), and the organic phase (rather than the aqueous phase) acts as the carrier. The aqueous phase comprises water, the imprinting ion ($Li^+$ in this example), one or more water soluble ligand monomers, one or more water soluble cross-linkers, and a water soluble initiator (like Wake VA-44). In some embodiments, a small amount of a non-ligand monomer may be added as needed, for example to modify the physical properties of the resulting MIP. The organic phase (carrier phase) could be as simple as kerosene. The advantage of RPSP for preparing very high capacity MIPs for e.g., lithium, is that a water soluble ligand monomer does not require bulky organic groups (as would a hydrocarbon-soluble ligand monomer) to keep it solubilized in the phase of the suspension polymerization mixture in which polymerization occurs.

Such lithium selective MIPS according to the present have a capacity of at least about 15, 20, 25, or 30 mg $Li^+$ per gram MIP.

The MIP materials of the present disclosure, prepared in most embodiments using surrogates as a template rather than the target molecule, provide superior properties compared to conventional ion exchange resins. Conventional ion exchange materials can provide relatively high initial loadings of the target molecule, e.g. lithium salts, scandium salts, or mercury salts as described herein, but the capacity decreases rapidly in use, requiring replacement after a relatively small number of elution cycles, and reducing the extraction capacity during use. Conventional ion exchange resins are readily "poisoned" by the presence of other metals like copper that are not removed during the elution cycle. In addition, conventional ion exchange resins can be sensitive to pH changes. Resin beads also swell and contract in use as the beads bind and release ions during regeneration. Over time and under particular external conditions (e.g., hydraulic shock, chlorine and chloramine degradation, fouling (particulate and organic), oxidation, osmotic shock from the regeneration process and basic attrition from backwash), etc. the beads can weaken and break down.

In contrast, the MIP materials of the present disclosure have high selectivity for the target metals. Although some conventional ion exchange resins can have higher overall capacity compared to the MIPS of the present disclosure, because the inventive MIPS have higher selectivity for the target ion, the MIPS of the present disclosure absorb more of the target ion per unit weight (up to about 25 mg $Li^+$/g MIP, about 5-15 mg $Sc^{3+}$/g MIP, about 10-35 mg $Hg^{2+}$/g MIP) than conventional ion exchange resins, have better retention of capacity and less variability of adsorption during use, and lower regeneration/elution costs. In addition, the MIP materials of the present disclosure are substantially less expensive to manufacture than MIP materials using the target molecule itself to template the complexing cavity, and are comparable or modestly more expensive than conventional ion exchange resins. As a result, the MIP materials of the present disclosure can provide substantially reduced capital and process costs relative to conventional processes designed around conventional absorbents (e.g., activated carbon, conventional ion exchange resins, conventional MIP resins template with the target molecule, etc.).

Conventional MIP beads for extracting precious and other metals have been proposed (e.g., U.S. Pat. No. 7,746,316), as the higher selectivity for precious metal ions allows for smaller bed volumes of MIP beads compared to conventional ion exchange resins (or carbon), but since conventional MIP beads are prepared using the target precious metal ions as templates for the MIP beads, the cost of preparing the large quantities of MIP beads required is prohibitive. In addition, many metal complexes are toxic and the monomer ligand/complexes are difficult or unstable to work with in large quantities. Accordingly, there has been no practical or commercially viable way to make MIP beads using the aforementioned patent at the scales required to meet commercial application requirements.

Although the use of surrogate ions to prepare MIPS has been described in U.S. Ser. No. 15/176,758, selection of the appropriate surrogate ion and/or ligand monomer to prepare a commercially acceptable and useful, selective, and durable MIPS material is unpredictable and complex due to the need to identify surrogates with the appropriate charge and molecular shape to mimic the desired target ion, which form stable complexes with the ligand monomer(s) which are compatible with polymerization conditions, form beads with the appropriate porosity and mechanical characteristics, and provide MIPS which ultimately will complex strongly with the target ion under use conditions. Identifying a surrogate and ligand monomer meeting these various requirements is difficult. In some instances, surrogate ions with the appropriate charge and molecular shape are identified, but are incompatible with the required polymerization conditions, or with other monomers used in the MIP beads. In other cases, modification of an otherwise suitable ligand to render it polymerizable (e.g., adding a polymerizable vinyl group) results in a ligand monomer which, when polymerized, no longer binds to the desired target ion. Thus, although the concept of preparing MIP beads using surrogates appears straightforward in theory, as a practical matter identifying combinations of ligand monomers (and other monomers) and surrogate ions suitable for a particular application requires considerable experimentation.

Furthermore, even though MIP beads prepared using a surrogate as disclosed herein are theoretically less selective than those prepared using the target ion as a template, the MIP beads of the present disclosure provide substantial cost savings compared to conventional absorbents such as activated carbon or conventional ion exchange resins. In mining operations the MIP beads of the present disclosure can increase overall extraction by between three (3) to five (5) % and can reduce operating costs by as much as 60%. In some cases, the proposed MIP may provide the only viable extraction technology. These resin beads can essentially be plug-substituted to a plant's current operations without plant redesign. Moreover, due to their lower manufacturing cost compared to conventional MIP materials, the "surrogate" MIP materials of the present disclosure are cost effective for the extraction of lower value metals (e.g., copper, lithium and the like) where conventional MIP materials would be prohibitively expensive.

For similar reasons, treating waste water streams with MIP beads to remove toxic metal complexes (e.g., $Hg(CN)_4^{2-}$) is impractical and not commercially feasible with conventional MIP beads prepared using these target ions to template the MIP beads, again, because the scale of the respective treatment processes would require correspondingly large amounts of these hazardous metal complexes in the MIP production process.

Such scale-up problems in preparing MIP absorbents can be circumvented by replacing the respective target ion as the template in preparing the MIP with a carefully selected surrogate ion of approximately the same shape, size and charge as the target ion, so as to create complexing cavities in the MIP similar to those which would have been created using the target ion itself as the template. However, the surrogates are less expense and more readily available than the target ion, less toxic, form sufficiently stable complexes with the ligand monomer and otherwise do not compromise the ability to polymerize the MIP. For example a suitable surrogate for preparing molecularly imprinted polymers suitable for selectively binding auro bis-dithiosulfate ($Au(S_2O_3)_2^{3-}$) for molecular imprinting includes inorganic or organic dianions such as (but not limited to) tetra, penta, or hexathionates; hexa-, heptyl-, octyldionates; 1,4-phenylene diacetate; or butane, pentane, hexane disulfonates. A suitable surrogate for preparing molecularly imprinted polymers suitable for selectively binding $Hg(CN)_4^{2-}$ is isophthalate or dithiocarbamates (see above) utilizing calcium as a counter-ion. A suitable surrogate for preparing molecularly imprinted polymers suitable for selectively binding scandium tricarbonate includes the tribasic salt of trimesic acid (benzene-1,3,5-tricarboxylate) or benzene-1,3,5-triyl tricarboxylate.

Lithium is neither a very costly or very toxic metal and may be utilized as a traditional molecular imprinting template by itself. However, the atomic mass of lithium is very low (6.9 g/mol) and the value of lithium is modest, which would require a MIP to have an enormous number of active sites to be economically feasible. Such a MIP can be provided with a 1-(4-vinylpyridine-2-yl)methanimine ligand monomer, with little or no inert monomer or cross-linking agent. In conventional MIP compositions, the molar ratio of non-ligand monomers to ligand monomer is typically about 50:1, whereas in the high capacity lithium selective MIP materials of the present disclosure, the molar ratio of non-ligand monomers to ligand monomer is much lower, less than about 10:1, 9:1, 8:1, 7:1, 6:1, 5:1, 4:1, 3:1, 2:1, or about 1:1. In some embodiments, the weight percent of ligand monomer in the lithium-selective MIP is about 99%, about 95%, about 90%, about 85%, about 80%, about 75%, about 70%, about 65%, about 60%, about 55%, or about 50%, including all ranges and sub ranges therebetween. In some embodiments, the 1-(4-vinylpyridine-2-yl)methanimine ligand monomer could comprise all, or nearly all of the MIP. The 1-(4-vinylpyridin-2-yl)methanimine ligand monomer can also be functionalized to include a long alkyl group (the R group) attached to the methanimine functional group of the ligand to improve solubility to the lithium bis(1-(4-vinylpyridine-2-yl)methanimine) ligand monomer complex under suspension polymerization conditions. Suitable R groups include $C_4$-$C_{24}$ alkyl groups, including linear and branched saturated alkyl groups, such as $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, or $C_{24}$ branched or linear alkyl groups. In some embodiments, the 1-(4-vinylpyridin-2-yl)methanimine ligand monomer may be a mixture of such ligand monomers functionalized with different R groups. In other embodiments the 1-(4-vinylpyridin-2-yl)methanimine ligand monomers all have the same R groups.

In conventional processes, the goal has typically been to maximize the selectivity of the absorbent for the desired target species to be removed or sequestered. This is particularly true for processes using MIP materials as absorbents, as the MIP materials exhibit extremely high selectivity for the target molecule used as a template in the preparation of the MIP material. However, the additional selectivity provided by a MIP material prepared using the target molecule as a template (i.e., conventional MIP materials) does not translate into a significant process advantage, particularly if the target molecule used to template the MIP material is expensive, toxic, difficult to obtain, or interferes with polymerization of the MIP material itself. Such factors can dramatically increase the cost of manufacturing the MIP material, and thereby offset any processing advantages provided by the higher selectivity.

The present applicants have found that in many processes, it is sufficient to provide a MIP material that is significantly more selective for the desired target molecule than the other species in solution, or alternatively stated, a MIP material which is substantially less selective, or excludes, non-target species in the mixture to be separated.

The MIP materials (e.g., beads or macroreticular beads) prepared using suitable surrogates rather than the target molecule (e.g., ion) are selective for the target molecule (e.g., ion). The selectivity of the MIP material to bind specie "A" in a mixture of "A" and specie "B" can be characterized by a "selectivity coefficient" using the following relationship:

$$\text{Selectivity coefficient for } A = \frac{[A'][B]}{[A][B']}$$

where "[A]" and "[B]" refer to the molar concentration of A and B in solution, and "[A']" and "[B']" refer to the concentration of complexed "A" and "B" in the MIP material.

For conventional MIP materials, prepared using the target molecule to template the complexing cavity, the selectivity coefficient for the target molecule would be higher than other species, as the complexing cavity is optimally configured for the shape, size, charge, etc. of the target molecule. For MIP materials prepared according to the present disclosure, using a surrogate molecule instead of the target molecule to template the MIP material, the selectivity coefficient for the surrogate molecule would be higher than, e.g., the target molecule, but the selectivity of the MIP material for the target molecule would still be significantly higher than for other dissolve species in the mixture to be separated. For most separations, the selectivity coefficient for the target ion versus other species in the mixture to be separated should be at least about 10, at least about 11, at least about 12, at least about 13, at least about 14, at least about 15, at least about 20, at least about 25, at least about 30, at least about 35, at least about 40, at least about 45, at least about 50, at least about 55, at least about 60, at least about 70, at least about 80, at least about 90, at least about 100, at least about 200, at least about 300, at least about 400, at least about 500, including ranges between any of these values.

As used herein, the term "bind," "binding," "bond,", "bonded," or "bonding" refers to the physical phenomenon of chemical species being held together by attraction of atoms to each other through sharing, as well as exchanging, of electrons or protons. This term includes bond types such as: ionic, coordinate, hydrogen bonds, covalent, polar covalent, or coordinate covalent. Other terms used for bonds such as banana bonds, aromatic bonds, or metallic bonds are also included within the meaning of this term. The selective binding interactions refer to preferential and reversible binding exhibited by the MIP for an ion (anion or cation), as described herein.

One of the embodiments of the present disclosure relates to a plurality of macroreticular polymer beads comprising a copolymer having a plurality of complexing cavities which selectively bind a target metal ion complex, wherein the copolymer is prepared from:
 (a) one or more ligand monomers which are complexed to a non-metal di- or trianion,
 (b) one or more uncharged (non-ligand) monomers, and
 (c) one or more crosslinking monomers;
 wherein:
  (i) the charge of the copolymer in the complexing cavity is opposite the charge of the target metal ion complex, and
  (ii) the non-metal surrogate di- or trianion has substantially the same shape and charge as the target metal ion complex.

In another embodiment, the present disclosure relates to a plurality of macroreticular polymer beads comprising a copolymer having a plurality of complexing cavities which selectively bind a target metal ion complexed to one or more anionic ligands, wherein the copolymer is prepared from:
 (a) one or more anionic ligand monomers which are complexed to a surrogate cation,
 (b) one or more uncharged monomers, and
 (c) one or more crosslinking monomers;
 wherein:
  (i) the charge of the copolymer in the complexing cavity is the opposite of the charge of the target metal ion,
  (ii) the surrogate cation has substantially the same shape and charge as the target metal ion, and
  (iii) the target metal ion has a higher binding affinity for the ligand monomer than the surrogate cation.

In another embodiment, the present disclosure relates to a plurality of macroreticular polymer beads comprising a copolymer having a plurality of complexing cavities which selectively bind a target metal ion, wherein the copolymer is prepared from:
(a) one or more anionic ligand monomers which are complexed to the target metal ion,
(b) one or more uncharged monomers, and
(c) one or more crosslinking monomers;
    wherein the copolymer comprises more than [50 mol %?] anionic ligand monomer.

Another embodiment relates to a method of preparing macroreticular molecularly imprinted polymer beads as described herein, comprising polymerizing:
(a) one or more cationic ligand monomers complexed to a non-metal surrogate di- or trianion,
(b) one or more uncharged monomers, and
(c) one or more crosslinking monomers,
wherein:
(i) the charge of the copolymer in the complexing cavity is opposite the charge of the target metal ion complex, and
(ii) the non-metal surrogate di- or trianion has substantially the same shape and charge as the target metal ion complex.

Another embodiment relates to a method of preparing macroreticular molecularly imprinted polymer beads comprising polymerizing:
(a) one or more anionic ligand monomers which are complexed to a surrogate cation such as $Ca^{2+}$,
(b) one or more uncharged monomers, and
(c) one or more crosslinking monomers;
wherein:
(i) the charge of the copolymer in the complexing cavity is the opposite of the charge of the target metal ion,
(ii) the surrogate cation has substantially the same shape and charge as the target metal ion, and
(iii) the target metal ion has a higher binding affinity for the ligand monomer than the surrogate cation.

Another embodiment relates to a method of preparing macroreticular molecularly imprinted polymer beads as described herein, comprising polymerizing:
(a) one or more anionic ligand monomers which are complexed to the target metal ion,
(b) one or more uncharged monomers, and
(c) one or more crosslinking monomers;
wherein:
(i) the copolymer comprises more than 50 mol % anionic ligand monomer.

The ligand monomers of the present disclosure include monodentate, bidentate, and polydentate ligands, such as N,N,N-tripentyl-N'-vinylbenzyl ammonium. The amount and type of ligands needed for a given cationic or anionic molecularly imprinted polymer bead would depend on the number of coordination sites available on the target compound and the associated ligands.

In other embodiments, the ligand monomer is a polymerizable imine such as 1-(4-vinylpyridin-2-yl)methanimine, and its alkylated derivatives as described herein.

The target cation ligand complex can be formed by a combination of ligands and target compounds that provides an overall stable complex. The methods of the present disclosure include target cationic ligand complexes that limit side oxidation/reduction (redox) reactions during polymerization. In one embodiment, the target cationic ligand complex has a redox potential of at least 0.3 eV versus SCE (standard calomel electrode). Additionally, the target cation ligand complex can be formed at various pH ranges. In one embodiment, the target cationic ligand complex can be formed in a pH range of 1 to 13. In another embodiment, the target cationic ligand complex can be polymerized in a pH range of 5 to 9.

In some embodiments, the ligand molecule is a hard base ligand featuring a polymerizable group, e.g., a vinyl group.

The polymerizable groups of the ligand monomers can include any conventional in the art, for example vinyl, styryl, acryloyl, methacryloyl, etc., or any of the polymerizable groups for any of the monomers disclosed herein. In some embodiments, the non-metal surrogate ion is an organic anion. Non-metal or organic surrogate dianions or trianions, of the present disclosure have substantially the same shape and charge as the target metal ions.

Substantially the same size and shape means that space filling models of the target molecule (e.g., a target anion) and the surrogate (e.g. a non-metal surrogate ion/organic anion) if superimposed on each other such that the overlap between the volumes defined by the space filling models is maximized (e.g. determined by means of commercial molecular modeling programs such as ChemBioDraw® Ultra 14.0) would differ by no more than about 50%, for example, no more than about 50%, no more than about 45%, no more than about 40%, no more than about 35%, no more than about 30%, no more than about 25%, no more than about 20%, no more than about 15%, the more than about 10%, or no more than about 5%, inclusive of all ranges and subranges therebetween.

Alternatively, a surrogate which is substantially the same size and shape as the target molecule can be functionally defined by the selectivity of the resulting MIP material for the target molecule (e.g., target ion). Since the complexing cavity of the inventive MIP materials is templated by a surrogate molecule rather than the target molecule, the selectivity for the MIP material for the surrogate material would be higher than for the target molecule. However, to the extent that the size and shape of the surrogate molecule would be substantially the same as the size and shape of the target molecule, the resulting MIP material would have a relatively high selectivity coefficient for the target molecule. Accordingly, higher selectivities for the target molecule would be indicative that the sizes and shapes of the target and surrogate molecules are substantially similar. In some embodiments the selectivity coefficient of the MIP materials of the present disclosure for the target molecule, templated with a surrogate molecule, are greater than about 10. In other embodiments, the selectivity coefficient of the MIP materials of the present disclosure are greater than: about 15, about 20, about 25, about 30, about 35, about 40, about 45, about 50, about 100, about 150, about 200, about 300, about 400, about 500, about 600, about 700, about 800, about 900, or about 1000, inclusive of all ranges therebetween.

Specific and non-limiting non-metal surrogate ions for $Au(S_2O_3)_2^{3-}$ may include tetra-, penta-, or hexathionates, hexa-, heptyl-, octyldionates: 1,4-phenylene diacetate: or butane, pentane, hexane disulfonates. A specific and non-limiting surrogate ion for $Hg(CN)_4^{2-}$ is $Ca^{2+}$. A specific and non-limiting non-metal surrogate ion for scandium is tribasic salt of trimesic acid (benzene-1,3,5-tricarboxylate) or benzene-1,3,5-triyl tricarboxylate.

Applicants have surprisingly found that commercially useful MIPS for selective removal of lithium salts can be prepared without the use of a surrogate ion. A specific and non-limiting ligand monomer for lithium is 1-(4-vinylpyridine-2-yl)methanimine or polymerizable crown ethers.

In some embodiments macroreticular polymer beads comprise a copolymer having a plurality of complexing cavities which selectively bind the target metal ion and wherein the copolymer is prepared from a cationic ligand monomer.

In some embodiments, the target metal ion is $Hg(CN)_4^{2-}$, the surrogate ion is $Ca^{2+}$, and the ligand monomer is a polymerizable dithiocarbamate.

In some embodiments, the target metal ion is scandium tricarbonate, and the nonmetal surrogate is trimesic acid (benzene-1,3,5-tricarboxylate) or benzene-1,3,5-triyl tricarboxylate.

In some embodiments, the target metal ion is $Au(S_2O_3)_2^{3-}$, and the nonmetal surrogate is tetra-, penta-, or hexathionate, hexa-, heptyl-, octyldionate; 1,4-phenylene diacetate; or butane, pentane, or hexane disulfonate.

In some embodiments, the target metal ion is Li (salt?), and the ligand monomer is 1-(4-vinylpyridine-2-yl)methanimine, optionally substituted with a $C_4$-$C_{24}$ branched or linear alkyl group as described herein. The MIPS selected for lithium as described herein is prepared without forming a complex with a surrogate ion.

A wide variety of monomers may be used as a non-ligand monomer for synthesizing the MIP in accordance with the present disclosure. Suitable non-limiting examples of non-ligand monomers that can be used for preparing a MIP of the present disclosure include methylmethacrylate, other alkyl methacrylates, alkylacrylates, allyl or aryl acrylates and methacrylates, cyanoacrylate, styrene, substituted styrenes, methyl styrene (multisubstituted) including 1-methylstyrene; 3-methylstyrene; 4-methylstyrene, etc.; vinyl esters, including vinyl acetate, vinyl chloride, methyl vinyl ketone, vinylidene chloride, acrylamide, methacrylamide, acrylonitrile, methacrylonitrile, 2-acetamido acrylic acid; 2-(acetoxyacetoxy) ethyl methacrylate; 1-acetoxy-1,3-butadiene; 2-acetoxy-3-butenenitrile; 4-acetoxystyrene; acrolein; acrolein diethyl acetal; acrolein dimethyl acetal; acrylamide; 2-acrylamidoglycolic acid; 2-acrylamido-2-methyl propane sulfonic acid; acrylic acid; acrylic anhydride; acrylonitrile; aeryloyl chloride; 1-α-acryloyloxy-β,β-dimethyl-γ-butyrolactone; N-acryloxy succinimide acryloxytris(hydroxymethyl)amino-methane; N-acryloyl chloride; N-acryloyl pyrrolidinone; N-acryloyl-tris(hydroxymethyl)amino methane; 2-aminoethyl methacrylate; N-(3-aminopropyl)methacrylamide; (o, m, or p)-amino-styrene; t-amyl methacrylate; 2-(1-aziridinyl)ethyl methacrylate; 4-benzyloxy-3-methoxystyrene; 2-bromoacrylic acid; 4-bromo-1-butene; 3-bromo-3,3-difluoropropane; 6-bromo-1-hexene; 3-bromo-2-methacrylonitrile; 2-(bromomethyl)acrylic acid; 8-bromo-1-octene; 5-bromo-1-pentene; cis-1-bromo-1-propene; -bromostyrene; p-bromostyrene; bromotrifluoro ethylene; (±)-3-buten-2-ol; 1,3-butadiene; 1,3-butadiene-1,4-dicarboxylic acid 3-butenal diethyl acetal; 1-butene; 3-buten-2-ol; 3-butenyl chloroformate; 2-butylacrolein; t-butylacrylamide; butyl acrylate; butyl methacrylate; (o, m, p)-bromo styrene; t-butyl acrylate; 1-carvone; (S)-carvone; (−)-carvyl acetate; 3-chloroacrylic acid; 2-chloroacrylonitrile; 2-chloroethyl vinyl ether; 2-chloromethyl-3-trimethylsilyl-1-propene; 3-chloro-1-butene; 3-chloro-2-chloromethyl-1-propene; 3-chloro-2-methyl propene; 2,2-bis(4-chlorophenyl)-1,1-dichloroethylene; 3-chloro-1-phenyl-1-propene; m-chlorostyrene; o-chlorostyrene; p-chlorostyrene; 1-cyanovinyl acetate; 1-cyclopropyl-1-(trimethylsiloxy)ethylene; 2,3-dichloro-1-propene; 2,6-dichlorostyrene; 1,3-dichloropropene; 2,4-diethyl-2,6-heptadienal; 1,9-decadiene; 1-decene; 1,2-dibromoethylene; 1,1-dichloro-2,2-difluoroethylene; 1,1-dichloropropene; 2,6-difluorostyrene; dihydrocarveol; (±)-dihydrocarvone; (−)-dihydrocarvyl acetate; 3,3-dimethylacrylaldehyde; N,N'-dimethylacrylamide; 3,3-dimethylacrylic acid; 3,3-dimethylacryloyl chloride; 2,3-dimethyl-1-butene; 3,3-dimethyl-1-butene; 2-dimethyl aminoethyl methacrylate; 1-(3-butenyl)-4-vinylbenzene; 2,4-dimethy 1-2,6-heptadien-1-ol; 2,4-dimethyl-2,6-heptadienal; 2,5-dimethyl-1,5-hexadiene; 2,4-dimethyl-1,3-pentadiene; 2,2-dimethyl-4-pentenal; 2,4-dimethylstyrene; 2,5-dimethylstyrene; 3,4-dimethylstryene; 1-dodecene; 3,4-epoxy-1-butene; 2-ethyl acrolein; ethyl acrylate; 2-ethyl-1-butene; (±)-2-ethylhexyl acrylate; (±)-2-ethylhexyl methacrylate; 2-ethyl-2-(hydroxymethyl)-1,3-propanediol triacrylate; 2-ethy 1-2-(hydroxymethyl)-1,3-propanediol trimethacrylate; ethyl methacrylate; ethyl vinyl ether; ethyl vinyl ketone; ethyl vinyl sulfone; (1-ethylvinyl) tributyl tin; m-fluorostyrene; o-fluorostyrene; p-fluorostyrene; glycol methacrylate (hydroxyethyl methacrylate); GA GMA; 1,6-heptadiene; 1,6-heptadienoic acid; 1,6-heptadien-4-ol; 1-heptene; 1-hexen-3-ol; 1-hexene; hexafluoropropene; 1,6-hexanediol diacrylate; 1-hexadecene; 1,5-hexadien-3,4-diol; 1,4-hexadiene; 1,5-hexadien-3-ol; 1,3,5-hexatriene; 5-hexen-1,2-diol; 5-hexen-1-ol; hydroxypropyl acrylate; 3-hydroxy-3,7,11-trimethyl-1,6,10-dodecatriene; isoamyl methacrylate; isobutyl methacrylate; isoprene; 2-isopropenylaniline; isopropenyl chloroformate; 4,4'-isopropylidene dimethacrylate; 3-isopropyl-a-a-dimethylbenzene isocyanate; isopulegol; itaconic acid; itaconalyl chloride; (±)-linalool; linalyl acetate; p-mentha-1,8-diene; p-mentha-6,8-dien-2-ol; methyleneamino acetonitrile; methacrolein; [3-(methacryloylamino)-propyl]trimethylammonium chloride; methacrylamide; methacrylic acid; methacrylic anhydride; methacrylonitrile; methacryloyl chloride; 2-(methacryloyloxy)ethyl acetoacetate; (3-methacryloxypropyl)trimethoxy silane; 2-(methacryloxy)ethyl trimethylammonium methyl sulfate; 2-methoxy propene (isopropenyl methyl ether); methyl-2-(bromomethyl)acrylate; 5-methyl-5-hexen-2-one; methyl methacrylate; N,N'methylene bisacrylamide; 2-methylene glutaronitrite; 2-methylene-1,3-propanediol; 3-methyl-1,2-butadiene; 2-methyl-1-butene; 3-methyl-1-butene; 3-methyl-1-buten-1-ol; 2-methyl-1-buten-3-yne; 2-methyl-1,5-heptadiene; 2-methyl-1-heptene; 2-methyl-1-hexene; 3-methyl-1,3-pentadiene; 2-methyl-1,4-pentadiene; (±)-3-methyl-1-pentene; (±)-4-methyl-1-pentene; (±)-3-methyl-1-penten-3-ol; 2-methyl-1-pentene; methyl vinyl ether; methyl-2-vinyloxirane; methyl vinyl sulfone; 4-methyl-5-vinylthiazole; myrcene; t-nitrostyrene; 3-nitrostyrene; 1-nonadecene; 1,8-nonadiene; 1-octadecene; 1,7-octadiene; 7-31 ctane-1,2-diol; 1-octene; 1-octen-3-ol; 1-pentadecene; 1-pentene; 1-penten-3-ol; t-2,4-pentenoic acid; 1,3-pentadiene; 1,4-pentadiene; 1,4-pentadien-3-ol; 4-penten-1-ol; 4-penten-2-ol; 4-phenyl-1-butene; phenyl vinyl sulfide; phenyl vinyl sulfonate; 2-propene-1-sulfonic acid sodium salt; phenyl vinyl sulfoxide; 1-phenyl-1-(trimethylsiloxy)ethylene; propene; safrole; styrene (vinyl benzene); 4-styrene sulfonic acid sodium salt; styrene sulfonyl chloride; 3-sulfopropyl acrylate potassium salt; 3-sulfopropyl methacrylate sodium salt; tetrachloroethylene; tetracyanoethylene; trans 3-chloroacrylic acid; 2-trifluoromethyl propene; 2-(trifluoromethyl)propenoic acid; 2,4,4'-trimethyl-1-pentene; 3,5-bis(trifluoromethyl)styrene; 2,3-bis(trimethylsiloxy)-1,3-butadiene; 1-undecene; vinyl acetate; vinyl acetic acid; 4-vinyl anisole; 9-vinyl anthracene; vinyl behenate; vinyl benzoate; vinyl benzyl acetate; vinyl benzyl alcohol; 3-vinyl benzyl chloride; 3-(vinyl benzyl)-2-chloroethylsulfone; 4-(vinyl benzyl)-2-chloroethyl sulfone; N-(p-vinylbenzyl)-N,N'-dimethyl amine; 4-vinyl biphenyl (4-phenylstyrene); vinyl bromide; 2-vinyl butane; vinyl butyl ether; 9-vinyl carbazole; vinyl carbinol; vinyl cetyl ether; vinyl chloroacetate; vinyl hloroformate; vinyl crotanoate;

vinyl peroxcyclohexane; 4-vinyl-1-cyclohexene; 4-vinylcyclohexene dioxide; vinyl cyclopentene; vinyl dimethylchlorosilane; vinyl dimethylethoxysilane; vinyl diphenylphosphine; vinyl 2-ethyl hexanoate; vinyl 2-ethylhexyl ether; vinyl ether ketone; vinyl ethylene; vinyl ethylene iron tricarbonyl; vinyl ferrocene; vinyl formate; vinyl hexadecyl ether; vinylidene fluoride; 1-vinylquinoline; vinyl iodide; vinyllaurate; vinyl magnesium bromide; vinyl mesitylene; vinyl 2-methoxy ethyl ether; vinyl methyl dichlorosilane; vinyl methyl ether; vinyl methyl ketone; 2-vinyl naphthalene; 5-vinyl-2-norbomene; vinyl pelargonate; vinyl phenyl acetate; vinyl phosphonic acid, bis(2-chloroethyl)ester; vinyl propionate; 4-vinyl pyridine; 2-vinyl pyridine; 1-vinyl-2-pyrrolidinone; 2-vinylquinoline; 1-vinyl silatrane; vinyl sulfone; vinyl sulfonic acid sodium salt; a-vinyl toluene; p-vinyl toluene; vinyl triacetoxysilane; vinyl tributyl tin; vinyl trichloride; vinyl trichlorosilane; vinyl trichlorosilane (trichlorovinylsilane); vinyl triethoxysilane; vinyl triethylsilane; vinyl trifluoroacetate; vinyl trimethoxy silane; vinyl trimethyl nonylether; vinyl trimethyl silane; vinyl triphenyphosphonium bromide (triphenyl vinyl phosphonium bromide); vinyl tris-(2-methoxyethoxy) silane; vinyl 2-valerate and the like.

Acrylate-terminated or otherwise unsaturated urethanes, carbonates, and epoxies can also be used in the MIP. An example of an unsaturated carbonate is allyl diglycol carbonate. Unsaturated epoxies include, but are not limited to, glycidyl acrylate, glycidyl methacrylate, allyl glycidyl ether, and 1,2-epoxy-3-allyl propane.

Cross-linking (also crosslinking) agents or cross-linking monomers that impart rigidity or structural integrity to the MIP are known to those skilled in the art, and include di-, tri- and tetrafunctional acrylates or methacrylates, divinylbenzene (DVB), alkylene glycol and polyalkylene glycol diacrylates andmethacrylates, including ethylene glycol dimethacrylate (EGDMA) and ethylene glycol diacrylate, vinyl or allyl acrylates or methacrylates, divinylbenzene, diallyl-diglycol dicarbonate, diallyl maleate, diallyl fumarate, diallyl itaconate, vinyl esters such as divinyl oxalate, divinyl malonate, diallyl succinate, triallyl isocyanurate, the dimethacrylates or diacrylates of bis-phenol A or ethoxylated bis-phenol A, methylene or polymethylene bisacrylamide or Bismuth-acrylamide, including hexamethylene bisacrylamide lanthanide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methyl-2-isocyanatoethyl methacrylate, 1,1-dimethy 1-2-isocyanaotoethyl acrylate, tetraethylene glycol diacrylate, tetraethylene glycol dimethacrylate, triethylene glycol diacrylate, triethylene glycol dimethacrylate, hexanediol dimethacrylate, hexanediol diacrylate, divinyl benzene; 1,3-divinyltetramethyl disiloxane; 8,13-divinyl-3,7,12,17-tetramethyl-21H,23H-porphine; 8,13-divinyl-3,7,12, 17-tetramethyl-21H,23H-propionic acid; 8,13-divinyl-3,7,12,17-tetramethyl-21H,23H-propionic acid disodium salt; 3,9-divinyl-2,4,8,10-tetraoraspiro[5,5]undecane; divinyl tin dichloride and the like.

The MIP must have sufficient rigidity so that the target ion may be easily removed without affecting the integrity of the polymer. In such cases where the polymer matrix is insufficiently rigid, crosslinking or other hardening agents can be introduced. In imprinted MIP, the cross-linker (cross-linking agent or monomer) fulfills three major functions: 1) the cross-linker is important in controlling the morphology of the polymer matrix, whether it is gel-type, macroporous or a microgel powder; 2) it serves to stabilize the imprinted binding site (complexing cavity); and 3) it imparts mechanical stability to the polymer matrix. In particular embodiments, high cross-link ratios are generally desired in order to provide permanently porous materials with adequate mechanical stability.

Any suitable conditions effective to polymerize the monomers of the present disclosure to produce an MIP without dissociating the ligand/surrogate complex may be used. The monomers of the present disclosure may be polymerized by free radical polymerization, and the like. Any UV or thermal free radical initiator known to those skilled in the art can be used in the preferred free radical polymerization. Examples of UV and thermal initiators include benzoyl peroxide, acetyl peroxide, lauryl peroxide, azobisisobutyronitrile (AIBN), t-butyl peracetate, cumyl peroxide, t-butyl peroxide; t-butyl hydroperoxide, bis(isopropyl) peroxy-dicarbonate, benzoin methyl ether, 2,2'-azobis(2,4-dimethyl-valeronitrile), tertiary butyl peroctoate, phthalic peroxide, diethoxyacetophenone, t-butyl peroxypivalate, diethoxyacetophenone, 1-hydroxycyclohexyl phenyl ketone, 2,2-dimethoxy-2-phenylacetophenone, and phenothiazine, diisopropylxanthogen disulfide, 2,2'-azobis-(2-amidinopropane); 2,2'-azobisisobutyronitrile-; 4,4'-azobis-(4-cyanovaleric acid); 1,1'-azobis-(cyclohexanecarbonitrile)-; 2,2'-azobis-(2, 4-dimethyl valeronitrile); and the like and mixtures thereof.

The choice of monomer and cross-linking agent will be dictated by the chemical (hydrophilicity, chemical stability, degree of cross-linking, ability to graft to other surfaces, interactions with other molecules, etc.) and physical (porosity, morphology, mechanical stability, etc.) properties desired for the polymer. The amounts of ligand monomer/surrogate complex, monomer and crosslinking agents should be chosen to provide a crosslinked polymer exhibiting the desired structural integrity, porosity and hydrophilicity. The amounts can vary broadly, depending on the specific nature/reactivities of the ligand/surrogate complex, monomer and crosslinking agent chosen as well as the specific application and environment in which the polymer will ultimately be employed. The relative amounts of each reactant can be varied to achieve desired concentrations of ligand/surrogate complexes in the polymer support structure. Typically, the amount of ligand surrogate complex will be on the order of about 0.01 mmol to about 100 mmol percent of monomer, including: about 0.02, 0.05, 0.1, 0.2, 0.3, 0.5, 1, 2, 3, 4, 5, 10, 15, 20, 25, 30, 35, 40, 45, 50, 55, 60, 65, 70, 75, 80, 85, 90, 95, or 100 mmole percent of monomer. The amount of cross-linker is typically on the order of about 1.0 to about 10 mole percent, including about 1.5, 2, 3, 4, 5, 6, 7, 8, or 9 mole percent of monomer. The amount of a free radical initiator can be about 0.005 to 1 mole percent, including about 0.01, 0.05, 0.1, 0.5, 0.6, 0.7, 0.8, or 0.9 mole percent of monomer. (Molar percentages refer to the percentage relative to the total amount of monomers prior to polymerization.)

In some instances the desired metal to be extracted has an extremely low mass such as lithium. A MIP that is commercially useful for use in bulk extraction of this metal has to have to have an enormously high number of collection sites. As such the ligand as described herein comprises all or nearly all of the monomer used in preparing the MIP with little to no supporting polymer backbone and crosslinking. Such a ligand monomer must be functionalized and soluble in the conditions of suspension polymerization and must still result in a final polymerized form that maintains the polymer qualities suitable for commercial use (rigidity, selectivity, reuse capability, temperature and pH resistance). MIP materials of the present invention are stable (physically and chemically) in a pH range of about 0-13 (including about 0, 1, 2, 3, 4, 5, 6, 7, 8, 9, 10, 11, 12, and 13, inclusive of all ranges therebetween), a temperature range of about 0-100° C. (including about 0, 10, 20, 30, 40, 50, 60, 70, 80, 90, 100° C., inclusive of all ranges therebetween), have a mass attrition of less than about 20 wt. % (including less than about 20, 15, 10, 9, 8, 7, 6, 5, 4, 3, 2, 1, 0.5, or approximately 0 wt. %, inclusive of all ranges therebetween), stability to at least about 20 you cycles (including about 2, 3, 4, 5, 6, 7, 8, 9, 10, 11, 12, 13, 14, 15, 16, 17, 18, 19, or 20, inclusive of all ranges therebetween) and a selectivity coefficient (as described herein) for the desired target ion of at least about 40 (including at least about 40, 45, 50, 55, 60, 65, 70, 75, 80, 85, 90, 95, or 100, inclusive of all ranges therebetween). The solvent, temperature, and means of polymerization can be varied in order to obtain polymeric materials of optimal physical or chemical features, for example, porosity, stability, and hydrophilicity. The solvent will also be chosen based on its ability to solubilize all the various components of the reaction mixture, and form a desirable polymer morphology.

The degree of crosslinking can range from about 1% to about 95%. In some embodiments, the degree of crosslinking is from about 5% to about 80%.

Any solvent which provides suitable solubility and is compatible with the desired reaction to the conditions to form the MIP materials of the present disclosure may be used. In some embodiments in which the MIP material is prepared by suspension polymerization conditions, the solvent can be a mixture of organic solvents. For example, the solvent can include long chain aliphatic alcohols such as pentanols, hexanols, heptanols, octanols, nonanols, decanols, undecanols, dodecanols, including saturated and unsaturated isomers thereof (e.g., methyl and ethyl pentanols, methyl and ethyl hexanols, methyl and ethyl, heptanols, etc.), aliphatic hydrocarbons (e.g., butanes, pentanes, hexanes, heptanes, etc.), aromatic hydrocarbons (e.g., benzene, toluene, xylenes, etc.), and combinations thereof.

The resin thus obtained is in the form of porous beads. Porous beads can have an open cell structure such that the majority of open volumes within the bead are interconnected with one another and external openings on surfaces of the bead.

In one embodiment, the present disclosure provides a method of selectively sequestering one or more target metal ions from a solution of the one or more target metal ion ions admixed with other ions, comprising first contacting the macroreticular polymer beads of the present disclosure with a stripping solution, whereby the non-metal surrogate ions are removed from the macroreticular polymer beads, then contacting the stripped beads with the solution, thereby selectively sequestering the target ion in the macroreticular polymer beads. The sequestered target ion is then stripped from the beads with an ionic solution capable of displacing the target ion, thereby regenerating the beads for reuse in sequestering target ions.

The present disclosure provides methods for preparation of MIPs. MIPs can be prepared by modification of known techniques including but not limited to those described in U.S. Pat. Nos. 4,406,792, 4,415,655, 4,532,232, 4,935,365, 4,960, 762, 5,015,576, 5,110,883, 5,208,155, 5,310,648, 5,321,102, 30 5,372,719, 5,786,428, 6,063,637, and 6,593, 142, and U.S. application Ser. No. 15/176,158 the entire contents of each of which are incorporated herein by reference in their entireties for all purposes.

The macroreticular beads of the present disclosure prepared using MIP technology are also useful in removing contaminants from an aqueous medium, e.g., drinking water, lakes, streams, irrigation runoff, industrial effluent, mine waste, etc.

Throughout the description, where methods or processes are described as having, including, or comprising specific process steps, the processes also consist essentially of, or consist of, the recited processing steps. Further, it should be understood that the order of steps or order for performing certain actions is immaterial so long as the method remains operable. Moreover, two or more steps or actions can be conducted simultaneously.

EXAMPLES

Example 1

Preparation of Macroreticular Beads

Exemplary Synthesis of Ligands

Exemplary Synthesis of Bis (N-(4-vinylbenzyl)-N-decyl-N,N-dimethylammonium) pentathionate

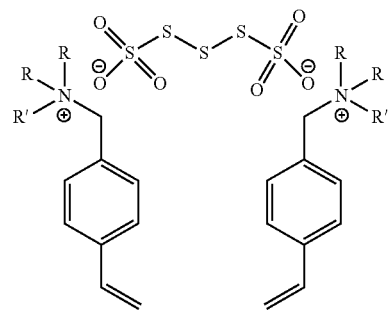

N-(4-vinylbenzyl)-N-decyl-N,N-dimethylammonium chloride (1.08 g, 3.2 mmol) was dissolved in deionized (DI) water (3 mL) in a 20 mL vial equipped with a micro stir bar. Sodium thiosulfate (1 g, 4 mmol) was also dissolved in DI water (0.67 mL) and was added the ligand solution. Immediately, the solution became thick and viscous and additional DI water (3 mL) was added to thin the solution. The solution was cooled to 0° C. with an ice bath while stirring. Concentrated hydrochloric acid (0.67 mL) was added dropwise over the course of one minute. A white material quickly formed, which was then replaced by yellow oil, which separated from solution. The mixture was allowed to settle for overnight at 4° C. The following day the aqueous phase was decanted, and the residue washed with water (5 ml). The residue was vacuum dried to give oil that became waxy below 0° C., (1.30 g, 94% yield). The product was stable for storage at 4° C. for several weeks without noticeable degradation. NMR (400 MHz, CDCl3, Estimated 7.54-7.36 (dd, 8H); 6.68-6.60 (dd, 2H); 5.78-5.73 (d, 2H); 5.31-5.28 (d, 2H); 4.78 (s, 4H); 3.30-3.28 (t, 4H); 3.15 (s, 12 H); 1.70 (bs, 4H); 1.25-1.19 (m, 28H); 0.84 (t, 6H).

Exemplary Synthesis of N-(4-Vinylbenzyl)-N,N,N-Tri-n-Pentylammonium Thiocyanate

A round bottom flask equipped with side arm is degassed, heated to 80° C. and maintained under inert atmosphere. 10 mL of acetonitrile is added, and then 4-vinylbenzylchloride and tri-n-pentyl amine (dried with 3 Å molecular sieves) (11.37 g, 50 mmol, TCI America) is added and kept under inert atmosphere. The mixture is allowed to react six (6) hours at 80° C. The acetonitrile is removed under vacuum and the residue is taken up in 25 mL diethyl ether. The product (N-(4-vinylbenzyl)-N,N,N-tri-n-pentylammonium chloride) is a white solid. The product is washed twice with 25 mL diethyl ether by adding diethyl ether to the product and filtering using 5.5 cm Medium Fast Qualitative filter. The product is a white fluffy solid, which is dried 3 hours under vacuum.

N-(4-vinylbenzyl)-N,N,N-tri-n-pentylammonium chloride (7.60 g, 20 mmol) is taken up in water (50 mL). Potassium thiocyanate (1.94 g, 20 mmol) in water (30 mL) is add to the ligand solution at a rate of 5 mL/min. A white precipitate forms and an oil settles from the solution. The oil is refrigerated overnight. The aqueous solution is decanted and the residue washed with 50 mL of water. The residue is vacuum dried to give an oil (N-(4-vinylbenzyl)-N,N,N-tri-n-pentylammonium thiocyanate) that becomes glassy below 0° C., (Quantitative yield: 8.05 g).

Exemplary Suspension Polymerization

Preparation of Aqueous Phase

Polyvinyl alcohol (PVOH, average Mw 89,000-98,000, 99+% hydrolyzed, 10.26 g) is dissolved in water (540 mL) through gentle heating to 80° C. 4.42 g of boric acid is dissolved in 135 mL in water and slowly added when the PVOH cools to 50° C.

Preparation of the Organic Phase and Polymerization 5 g of the complex is combined with 48.75 mL of ethylhexanol and 1.25 mL of xylenes in a 100 mL Erlenmeyer flask equipped with a stir bar and allowed to stir until fully dissolved. 35.88 mL of styrene and 13.68 mL of divinylbenzene are combined with the solution of complex, and allowed to stir, covered with a septum, under ambient conditions. 0.5 g of AIBN is added to the solution and dissolved completely. When dissolved, the solution is added to an addition funnel and degassed until the reaction temperature reaches 75° C. When the temperature reaches 80° C. to the solution is added to the aqueous phase at a rate of 1 mL/s. The reaction is allowed to proceed, with continuous agitation for approximately 8 hours.

Post-Reaction Bead Cleanup

Upon completion of the reaction, the beads are recovered from the aqueous by filtration. The beads are then soaked in deionized water (200 mL) for 10 minutes then filtered. Soaking in deionized water and filtration is repeated two times. The beads are washed twice in methanol, and twice in acetone. If desired, the beads can be fractionated by size using the appropriate mesh sieves. The beads can then be stored in water indefinitely at a temperature of 5 to 50° C., prior to activation.

Bead Activation

Wet beads are placed into a large jacketed glass column, and all entrained air is removed. The column is then heated to 50° C. and a solution of ferric sulfate hydrate (0.22 M) is added at a rate of 0.1 bed volumes/min for 15 bed volumes. The beads are then rinsed with water (10 bed volumes) at ambient to 50° C. Lithium-selective MIPs of the present invention can be activated with an acid wash. Scandium selective MIPs of the present invention can be activated with an acidic/alcohol wash (1 M hydrochloric or sulfuric acid/methanol at 50° C. Mercury-selective MIPs of the present invention can be activated with an acid wash, or can be used as manufactured without activation.

What is claimed is:

1. A plurality of macroreticular polymer beads comprising a copolymer having a plurality of complexing cavities which selectively bind $Au(S_2O_3)_2^{3-}$, wherein the copolymer is prepared from:
    (a) a cationic ligand monomer complexed to a non-metal surrogate ion selected from the group consisting of tetrathionate, hexathionate; hexadionate, heptyldionate, octyldionate; 1,4-phenylene diacetate; butane disulfonate, pentane disulfonate, and hexane disulfonate,
    (b) a non-ligand monomer, and
    (c) a crosslinking monomer;
    wherein the charge of the copolymer in the complexing cavity is opposite the charge of the target metal ion.

2. The macroreticular beads of claim 1, wherein the cationic ligand monomer comprises a cation selected from the group consisting of ammonium, pyridinium, pyrollidinium, imidazolium, guanidinium, phosphonium and sulfonium.

3. The macroreticular beads of claim 2, wherein the cationic ligand monomer is a 4-vinylbenzyl ammonium.

4. The macroreticular beads of claim 3, wherein the cationic ligand monomer is N-(4-vinylbenzyl)-N,N,N-tri-n-pentylammonium or N-(4-vinylbenzyl)-N-decyl-N,N-dimethylammonium.

5. The macroreticular beads of claim 3, wherein the cationic ligand monomer is N-(4-vinylbenzyl)-N,N,N-tri-n-pentylammonium.

6. The macroreticular beads of claim 3, wherein the cationic ligand monomer is N-(4-vinylbenzyl)-N-decyl-N,N-dimethylammonium.

7. The macroreticular beads of claim 1, wherein the beads have a surface area of about 0.1-500 m²/g.

8. A method of preparing the macroreticular polymer bead of claim 1 comprising polymerizing:
    (a) a cationic ligand monomer complexed to a non-metal surrogate ion selected from the group consisting of tetrathionate, hexathionate; hexadionate, heptyldionate, octyldionate; 1,4-phenylene diacetate; butane disulfonate, pentane disulfonate, and hexane disulfonate,
    (b) a non-ligand monomer, and
    (c) a crosslinking monomer.

9. The method of claim 8, wherein the cationic ligand monomer comprises a cation selected from the group consisting of ammonium, pyridinium, pyrollidinium, imidazolium, guanidinium, phosphonium and sulfonium.

10. The method of claim 8, wherein the cationic ligand monomer is a 4-vinylbenzyl ammonium.

11. The method of claim 8, wherein the cationic ligand monomer is N-(4-vinylbenzyl)-N,N,N-tri-n-pentylammonium or N-(4-vinylbenzyl)-N-decyl-N,N-dimethylammonium.

12. The method of claim 8, wherein the cationic ligand monomer is N-(4-vinylbenzyl)-N,N,N-tri-n-pentylammonium.

13. The method of claim 8, wherein the cationic ligand monomer is N-(4-vinylbenzyl)-N-decyl-N,N-dimethylammonium.

14. The method of claim 8, wherein the beads have a surface area of about 0.1-500 m²/g.

* * * * *